(12) United States Patent  
Phillips et al.

(10) Patent No.: US 8,789,356 B2  
(45) Date of Patent: Jul. 29, 2014

(54) ZONED CATALYTIC FILTERS FOR TREATMENT OF EXHAUST GAS

(75) Inventors: Paul Richard Phillips, Royston (GB); Guy Richard Chandler, Cambridge (GB); Keith Anthony Flanagan, Cambridge (GB)

(73) Assignee: Johnson Matthey Public Limited Company, London (GB)

( * ) Notice: Subject to any disclaimer, the term of this patent is extended or adjusted under 35 U.S.C. 154(b) by 282 days.

(21) Appl. No.: 13/354,720

(22) Filed: Jan. 20, 2012

(65) Prior Publication Data

US 2012/0186229 A1 Jul. 26, 2012

Related U.S. Application Data

(60) Provisional application No. 61/512,688, filed on Jul. 28, 2011.

(51) Int. Cl.  
*F01N 3/00* (2006.01)

(52) U.S. Cl.  
USPC .................................. 60/274; 60/295; 60/301

(58) Field of Classification Search  
USPC .......................................... 60/274, 295, 301  
See application file for complete search history.

(56) References Cited

U.S. PATENT DOCUMENTS

| | | | |
|---|---|---|---|
| 4,902,487 A | 2/1990 | Cooper et al. | |
| 5,516,497 A | 5/1996 | Speronello et al. | |
| 6,125,629 A * | 10/2000 | Patchett | 60/286 |
| 7,097,817 B2 * | 8/2006 | Brisley et al. | 423/245.3 |
| 7,767,176 B2 | 8/2010 | Patchett et al. | |
| 2009/0137386 A1 | 5/2009 | Pfeifer et al. | |
| 2009/0266063 A1 * | 10/2009 | Gandhi et al. | 60/301 |
| 2010/0101221 A1 * | 4/2010 | Charbonnel et al. | 60/301 |
| 2010/0115930 A1 * | 5/2010 | Brown et al. | 60/297 |
| 2010/0180580 A1 | 7/2010 | Boorse et al. | |
| 2010/0209327 A1 * | 8/2010 | Soeger et al. | 423/239.2 |
| 2011/0023463 A1 * | 2/2011 | Dobson et al. | 60/286 |
| 2011/0023591 A1 * | 2/2011 | Dobson et al. | 73/114.75 |
| 2011/0146237 A1 * | 6/2011 | Adelmann et al. | 60/274 |
| 2012/0304751 A1 * | 12/2012 | Dobson et al. | 73/114.75 |

FOREIGN PATENT DOCUMENTS

| | | |
|---|---|---|
| EP | 1 850 068 A1 | 10/2007 |
| EP | 1 859 864 A1 | 11/2007 |
| WO | 2011064666 A2 | 6/2011 |

OTHER PUBLICATIONS

GB Patent Application No. 1003784.4, filed Mar. 8, 2010, Johnson Matthey Public Limited Company.  
International Search Report for corresponding PCT Patent Application No. PCT/GB2012/051818 dated Nov. 2, 2012.

* cited by examiner

*Primary Examiner* — Thomas Denion  
*Assistant Examiner* — Jason Shanske  
(74) *Attorney, Agent, or Firm* — Jimmie D. Johnson, Jr.

(57) ABSTRACT

Provided is an SCRF article having different SCR catalysts compositions disposed on a wall-flow filter substrate in zones that are arranged in series with respect to the inlet and outlet faces of the substrate. Also provided is method of reducing backpressure and ammonia slip that involves the use of such SCRF articles.

16 Claims, 6 Drawing Sheets

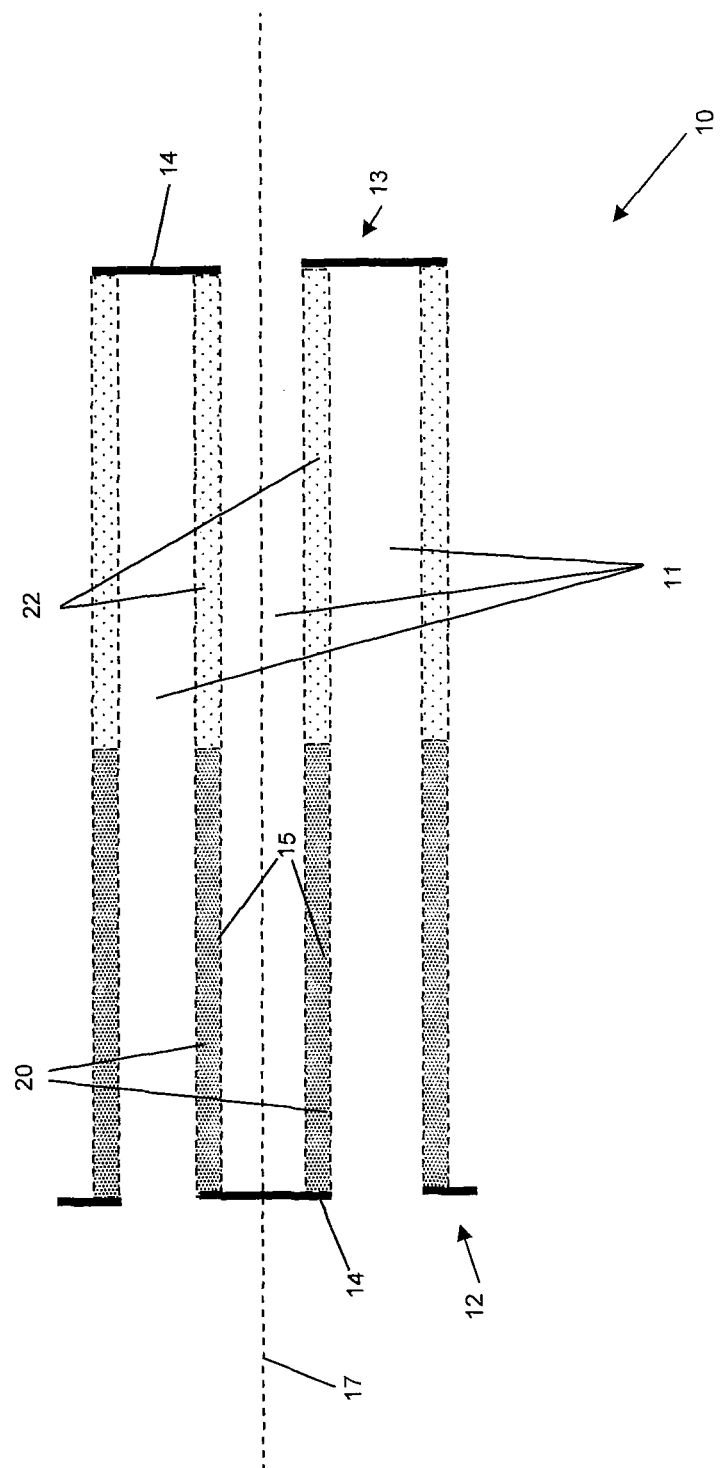

ZONED CATALYTIC FILTERS FOR TREATMENT OF EXHAUST GAS

CROSS-REFERENCE TO RELATED APPLICATIONS

This application claims priority of U.S. Provisional Patent Application No. 61/512,688, filed Jul. 28, 2011, the disclosure of which is incorporated herein by reference in its entirety for all purposes.

BACKGROUND

A.) Field of Use

The present invention relates to articles and methods that are useful for treating exhaust gases generated during hydrocarbon combustion. More particularly, the invention relates to catalytic filters for reducing $NO_x$ and soot in exhaust gas streams, such as those generated by diesel engines.

B.) Description of Related Art

Exhaust gas produced by on-road vehicles in the United States currently contributes about a third of the country's smog-producing air pollution. Efforts to reduce smog include the use of more fuel efficient engines, such as diesel engines compared to gasoline engines, and improved exhaust gas treatment systems.

The largest portions of most combustion exhaust gases contain relatively benign nitrogen ($N_2$), water vapor ($H_2O$), and carbon dioxide ($CO_2$); but the exhaust gas also contains in relatively small part noxious and/or toxic substances, such as carbon monoxide (CO) from incomplete combustion, hydrocarbons (HC) from un-burnt fuel, nitrogen oxides ($NO_x$) from excessive combustion temperatures, and particulate matter (mostly soot). One of the most burdensome components of vehicular exhaust gas is $NO_x$, which includes nitric oxide (NO), nitrogen dioxide ($NO_2$), and nitrous oxide ($N_2O$). The production of $NO_x$ is particularly problematic for lean burn engines, such as diesel engines. To mitigate the environmental impact of $NO_x$ in exhaust gas, it is desirable to eliminate these undesirable components, preferably by a process that does not generate other noxious or toxic substances The exhaust gas of diesel engines tends to have more soot compared to gasoline engines. Soot emissions can be remedied by passing the soot-containing exhaust gas through a particulate filter. However, the accumulation of soot particles on the filter can cause an undesirable increase in the back pressure of the exhaust system during operation, thereby decreasing efficiency. To regenerate the filter, the accumulated carbon-based soot must be removed from the filter, for example by periodically combusting the soot by passive or active oxidation. One such technique involves catalytic oxidation of the soot at low temperatures. For example, U.S. Pat. No. 4,902,487 teaches the use of $NO_2$ as an oxidant serving to effectively combust the collected soot at low temperatures. It has also been suggested that performance of a catalytic soot filter can be improved by overlapping different oxidation catalysts on a wall-flow soot filter (US Pat. Pub. No. 2009/0137386) or by zoning the oxidation catalyst using different catalyst concentrations (EP Pat. No. 1 859 864).

For lean burn exhaust gas, such as diesel exhaust gas, reducing reactions are generally difficult to achieve. However, one method for converting $NO_x$ in a diesel exhaust gas into more benign substances is commonly referred to as Selective Catalytic Reduction (SCR). An SCR process involves the conversion of $NO_x$, in the presence of a catalyst and with the aid of a reducing agent, into elemental nitrogen ($N_2$) and water. In an SCR process, a gaseous reductant, typically anhydrous ammonia, aqueous ammonia, or urea, is added to an exhaust gas stream prior to contacting the catalyst. The reductant is absorbed onto a catalyst and the $NO_x$ reduction reaction takes place as the gases pass through or over the catalyzed substrate. The chemical equation for a stoichiometric reaction using either anhydrous or aqueous ammonia for an SCR process is:

$$4NO + 4NH_3 + 3O_2 \rightarrow 4N_2 + 6H_2O$$

$$2NO_2 + 4NH_3 + 3O_2 \rightarrow 3N_2 + 6H_2O$$

$$NO + NO_2 + 2NH_3 \rightarrow 2N_2 + 3H_2O$$

Known SCR catalysts include zeolites or other molecular sieves disposed on or in a monolithic substrate. Examples of such molecular sieves include materials having a chabazite framework (e.g., SSZ-13 and SAPO-34), beta framework, mordenite framework (e.g., ZSM-5), and the like. To improve the material's catalytic performance and hydrothermal stability, molecular sieves for SCR applications often include exchanged metal ions that are loosely held to the molecular sieve's framework.

Since SCR catalysts generally serve as heterogeneous catalysts (i.e., solid catalyst in contact with a gas and/or liquid reactant), the catalysts are usually supported by a substrate. Preferred substrates for use in mobile applications include flow-through monoliths having a so-called honeycomb geometry that comprises multiple adjacent, parallel channels that are open on both ends and generally extend from the inlet face to the outlet face of the substrate. Each channel typically has a square, round, hexagonal, or triangular cross-sectional. Catalytic material is applied to the substrate typically as a washcoat or other slurry that can be embodied on and/or in the walls of the substrate.

Exhaust systems containing multiple components, even multiple SCR catalysts, are known. For example, U.S. Pat. No. 7,767,176 describes an exhaust system having two substrates, preferably non-filtering flow-through honeycombs, arranged in series wherein each substrate contains an SCR catalyst. Zoning non-filtering flow-through substrates with SCR catalysts followed by oxidation catalysts is also known (e.g., U.S. Pat. No. 5,516,497).

To reduce the amount of space required for an exhaust system, it is desirable to design individual exhaust components to perform more than one function. For example, applying an SCR catalyst to a wall-flow filter substrate instead of a flow-through substrate serves to reduce the overall size of an exhaust treatment system by allowing one substrate to serve two functions, namely catalytic conversion of $NO_x$ by the SCR catalyst and removal of soot by the filter. US Pat. Pub. 2010/0180580 discloses an SCR catalyst can be applied to a honeycomb substrate in the form of a wall-flow filter. Wall-flow filters are similar to flow-through honeycomb substrates in that they contain a plurality of adjacent, parallel channels. However, the channels of flow-through honeycomb substrates are open at both ends, whereas the channels of wall-flow substrates have one end capped, wherein the capping occurs on opposite ends of adjacent channels in an alternating pattern. Capping alternating ends of channels prevents the gas entering the inlet face of the substrate from flowing straight through the channel and existing. Instead, the exhaust gas enters the front of the substrate and travels into about half of the channels where it is forced through the channel walls prior to entering the second half of the channels and exiting the back face of the substrate.

A wall-flow filter having an SCR (SCRF) and an oxidation catalyst, wherein the SCR catalyst is disposed upstream of an oxidation catalyst, is described in GB Pat. Appln. 1003784.4, which is incorporated herein in its entirety by reference. However, there remains the need for improved SCRF systems having good catalytic performance while also having minimal back pressure.

SUMMARY OF THE INVENTION

Applicants have surprisingly found that the functionality of an SCRF component in an exhaust system can be improved by providing two or more catalytic zones that are arranged sequentially in the filter substrate with respect to the direction of overall flow of gas through the substrate. For example, compared to a filter substrate in which an SCR catalyst is loaded homogeneously in the axial direction, a zoned filter described herein leads to a reduction in the back pressure created by exhaust gas flowing through the substrate. Such zones can be created by loading a forward portion of a filter substrate (relative to the overall direction of gas flow) with first SCR catalyst that is thermally stable at high temperatures and a rearward portion with SCR catalyst having different performance, or by loading the forward and rearward portions of the filter with an SCR catalyst composition having the same catalytic components, but loading a relatively higher concentration of one or more of the components in the forward portion. This reduction in backpressure is surprising because it occurs when the concentration or type of catalyst is varied along the axial direction of the filter instead of direction in which the gas contacts the filter catalyst(s) (i.e., direction of permeation through the filter walls). That is, in a wall-flow filter, gas flows into the substrate via a filter inlet face and out of the substrate via a filter outlet face, thus creating an overall direction of gas flow that is parallel to the substrate's major axis. However, the gas contacts the catalytic component as it passes through the filter walls which is in a direction that is orthogonal to the substrate's axis. It has been found that varying the catalyst concentration in such an axial direction reduces backpressure compared to a catalyst concentration that is a homogenous distribution along the axis.

Accordingly, one aspect of the invention provides a catalyst article comprising (a) a wall flow monolith having an inlet face end and an outlet face and an axis of gas flow from said inlet face to said outlet face; (b) a first SCR catalyst composition comprising a molecular sieve material at a first sieve concentration and an exchanged metal at a first metal concentration, wherein said first SCR catalyst is disposed in a first zone; and (c) a second SCR catalyst composition comprising said molecular sieve material at a concentration that is at least 20% lower than said first sieve concentration, and exchanged metal at said first metal concentration, wherein said second SCR catalyst is disposed in a second zone; wherein said first zone and second zone are disposed within a portion of said wall flow monolith and in series along said axis, and wherein said first zone is disposed proximal to said inlet face, and said second zone is disposed proximal to said outlet face.

According to another aspect of the invention, provided is a catalyst article comprising (a) a wall flow monolith having an inlet face end and an outlet face and an axis of gas flow from said inlet face to said outlet face; (b) a first SCR catalyst composition comprising a molecular sieve material at a first sieve concentration and an exchanged metal at a first metal concentration, wherein said first SCR catalyst is disposed in a first zone; and (c) a second SCR catalyst composition comprising said molecular sieve material at a concentration that is at least 20% lower than said first sieve concentration, and exchanged metal at a concentration that is at least 20% lower than said first metal concentration, wherein said second SCR catalyst is disposed in a second zone; wherein said first zone and second zone are disposed within a portion of said wall flow monolith and in series along said axis, and wherein said first zone is disposed proximal to said inlet face, and said second zone is disposed proximal to said outlet face.

According to another aspect of the invention, provided is a catalyst article comprising (a) a wall flow monolith having an inlet face end and an outlet face and an axis of gas flow from said inlet face to said outlet face; (b) a first SCR catalyst composition comprising a molecular sieve material at a first sieve concentration and an exchanged metal at a first metal concentration, wherein said first SCR catalyst is disposed in a first zone; and (c) a second SCR catalyst composition comprising said molecular sieve material at said first sieve concentration, and said exchanged metal at a concentration that is at least 20% lower than said first metal concentration, wherein said second SCR catalyst is disposed in a second zone; wherein said first zone and second zone are disposed within a portion of said wall flow monolith and in series along said axis, and wherein said first zone is disposed proximal to said inlet face, and said second zone is disposed proximal to said outlet face.

According to another aspect of the invention, provided is a catalyst article comprising (a) a wall flow monolith having an inlet face end and an outlet face and an axis of gas flow from said inlet face to said outlet face; (b) a first SCR catalyst composition comprising a molecular sieve material and an exchanged metal, wherein said first SCR catalyst is disposed in a first zone; and (c) a second SCR catalyst composition comprising a second molecular sieve material and a second exchanged metal, wherein said second SCR catalyst is disposed in a second zone, wherein said first molecular sieve more thermally stable relative to said second molecular sieve, wherein said first zone and second zone are disposed within a portion of said wall flow monolith and in series along said axis, and wherein said first zone is disposed proximal to said inlet face, and said second zone is disposed proximal to said outlet face.

According to another aspect of the invention, provided is a method for reducing ammonia slip comprising (a) operating a diesel engine under conditions to generate a feed stream of exhaust gas comprising $NO_x$ and soot and having a temperature of about 250 to 550° C. and having a space velocity of about 20,000 to about 120,000/hour; (b) injecting a reductant into said feed stream to create an intermediate stream; and (c) passing said intermediate stream through a catalyst article according to an SCRF as described herein to produce a purified exhaust gas stream having a reduced soot and $NO_x$ concentration relative to said feed stream; wherein said purified exhaust gas stream has no ammonia or a concentration of ammonia that is less than an amount of ammonia that would be present if the intermediate stream were passed through an SCRF as described herein except that the SCR catalyst homogenously distributed with respect to the direction of overall gas flow.

According to another aspect of the invention, provided is a method for reducing back pressure in an exhaust treatment system comprising (a) operating a diesel engine under conditions to generate a stream of exhaust gas comprising $NO_x$ and soot and having a temperature of about 250 to 550° C. and having a space velocity of about 20,000 to about 120,000/hour; (b) injecting a reductant into said stream to create an intermediate stream; and (c) passing said intermediate stream through a catalyst article according to an SCRF described as herein to produce a purified exhaust gas stream having a reduced soot and $NO_x$ concentration relative to said feed stream, wherein said passing step produces a resistance to gas flow that is less than the amount of gas flow resistance that would be produced if the intermediate stream were passed through a catalyst article similar to the SCRF as described herein, but having an SCR catalyst homogenously distributed with respect to the direction of overall gas flow.

According to another aspect of the invention, provided is a method for reducing $NO_x$ in an exhaust gas comprising contacting the gas with a catalyst article according to an SCRF as described herein for a time and temperature sufficient to reduce the level of $NO_x$ compounds in the gas.

According to yet another aspect of the invention, provided is an engine exhaust gas treatment system comprising (a) a catalyst article according to an SCRF as described herein; and (b) a source of ammonia or urea upstream of said catalyst article.

BRIEF DESCRIPTION OF THE DRAWINGS

FIGS. 2A and 2B show cross-sectional views of a portion of a wall-flow filter unit having zoned catalyst according to an embodiment of the invention;

DETAILED DESCRIPTION OF PREFERRED EMBODIMENTS OF THE INVENTION

The present invention provides a catalytic filtration device that effectively and economically removes $NO_x$ and particulates from an exhaust gas stream, such as that of a lean-burn engine (e.g., diesel engine). In a preferred embodiment, provided is a wall-flow filter substrate having a plurality of catalytic zones. The zones are created by embodying different SCR catalysts and/or different concentrations of the same SCR catalyst components in separate portions of the substrate walls. Preferably, the zones are arranged in series with respect to the overall direction of exhaust gas flow through the filter substrate.

Figure 1A:
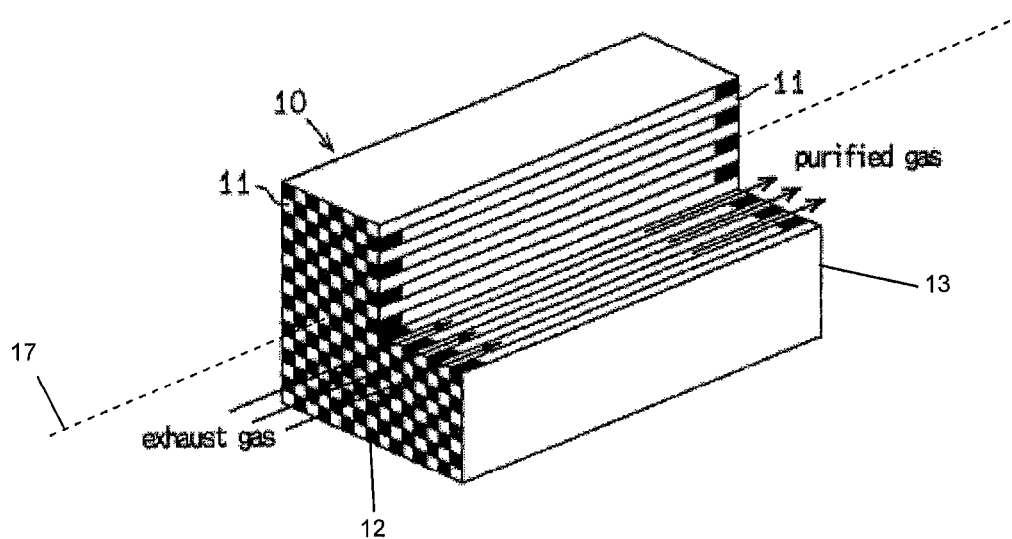
FIGS. 1A and 1B show views of a portion of a conventional wall-flow filter substrate.
Figure 1B:
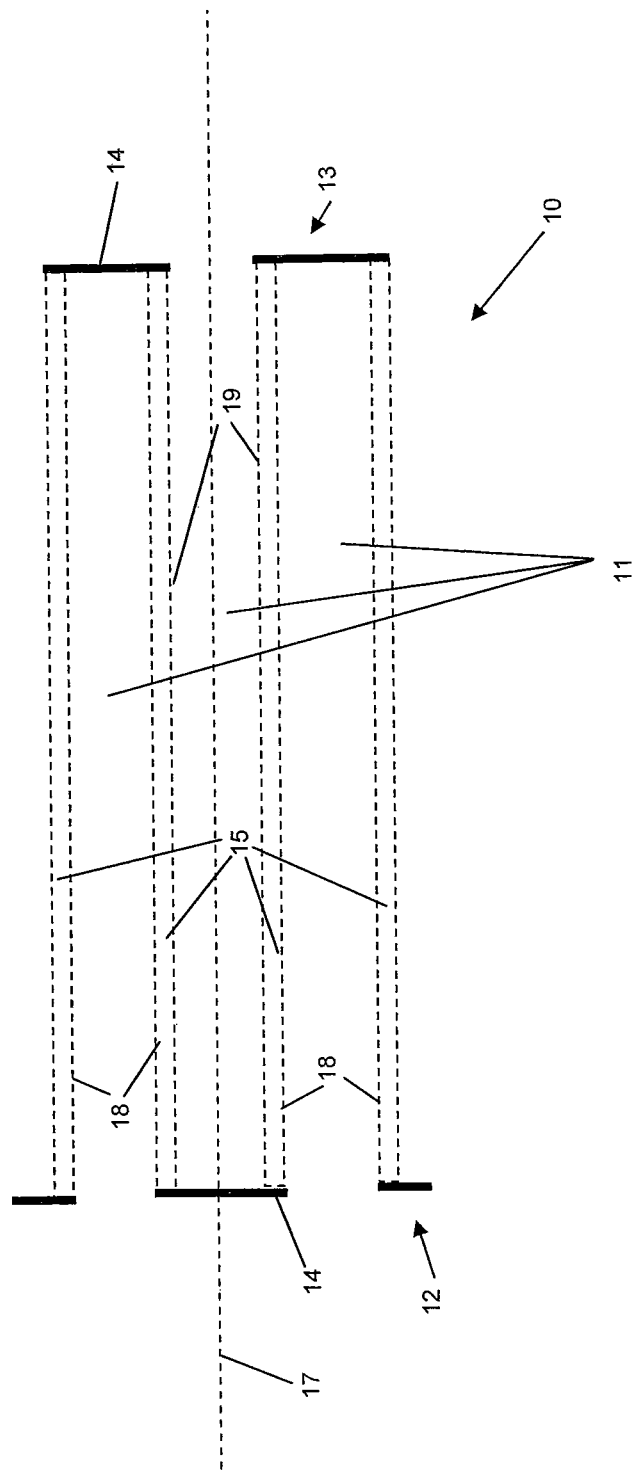

Turning to FIGS. 1a and 1b, shown are views of a portion of a conventional wall-flow filter substrate 10 for use in vehicular exhaust systems. The wall-flow substrate has multiple channels 11 that are approximately parallel to one another and that extend from an inlet face 12 of the substrate to an outlet face 13 of the substrate along an axis 17 of gas flow through the substrate (i.e., the direction of exhaust gas entering and purified gas exiting). Conventional wall-flow filter substrates for diesel engines typically contain 400-800 channels, but for simplicity only a few channels are shown in these Figures. The channels are defined by porous walls 15 and each channel has a cap 14 at either the inlet or outlet face of the substrate. The porous walls are also defined by an upstream side 18 and a downstream side 19, relative to the direction of gas flow through the walls. Wall-flow filter substrates for use in vehicular exhaust systems such as these are commercially available from a variety of sources.

Figure 2B:
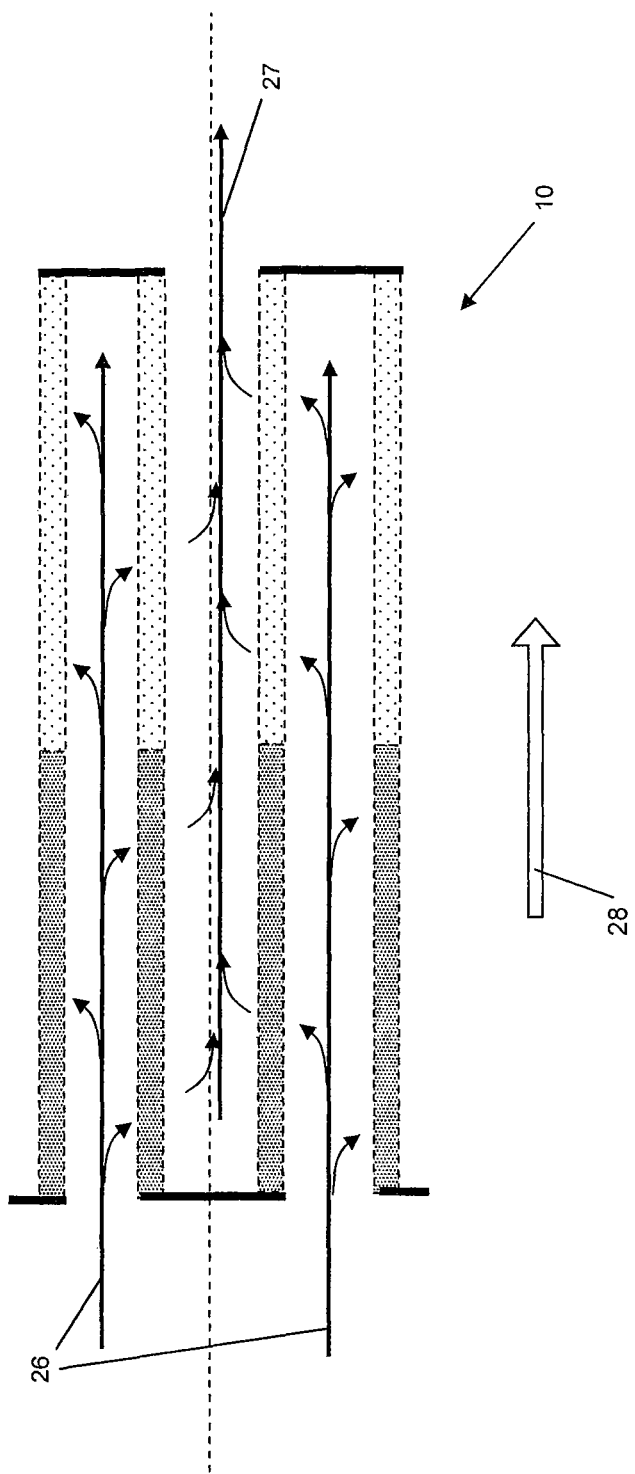

FIGS. 2A and 2B show cross-sectional views of a portion catalyst article according to an embodiment of the invention. Here, the catalyst article comprises a wall-flow filter substrate 10, a first SCR catalyst zone 20 embodied in a portion of the substrate wall 15 that is proximal to the inlet face 12, and a second SCR catalyst zone 22 embodied in another portion of the substrate wall 15 that is proximal to the outlet face 13. Thus, the first zone and second zone are not necessarily arranged in series with respect to the direction of gas flow through the wall (i.e., from the upstream side to the downstream side of the wall). Instead, the first and second zones are arranged in series with respect to the overall direction of expected exhaust gas flow through the substrate as shown by arrow 28 which is parallel to axis 17.

Exhaust gas untreated by the catalytic filter 26 flows into the substrate channels where it contacts the upstream side 18 of a substrate wall 15. During operation of an engine, a pressure differential exists between the inlet and outlet faces of the substrate (higher pressure at the inlet face relative to the outlet face), and thus a pressure differential also exists between the upstream side 18 and downstream side 19 of the substrate wall 15. This pressure differential, along with the gas permeable nature of the walls, allows the exhaust gas 26 that flows into a channel which is open to the inlet face, to pass from the upstream side 18 of a porous wall 15 to the downstream side 19 of that wall, and then into an adjacent channel which is open to the outlet face of the substrate. The exhaust gas passes through the wall in a direction that is orthogonal to axis 17, i.e., the overall direction of gas flow 28 through the substrate 10.

The substrate wall has a porosity and pore size that makes it gas permeable, but traps a major portion of the particulate matter, such as soot, from the gas as the gas passes through the wall. Preferred wall-flow substrates are high efficiency filters. Wall flow filters for use with the present invention preferably have an efficiency of least 70%, at least about 75%, at least about 80%, or at least about 90%. In certain embodiments, the efficiency will be from about 75 to about 99%, about 75 to about 90%, about 80 to about 90%, or about 85 to about 95%. Here, efficiency is relative to soot and other similarly sized particles and to particulate concentrations typically found in conventional diesel exhaust gas. For example, particulates in diesel exhaust can range in size from 0.05 microns to 2.5 microns. Thus, the efficiency can be based on this range or a sub-range, such as 0.1 to 0.25 microns, 0.25 to 1.25 microns, or 1.25 to 2.5 microns.

During normal operation of the exhaust system, the soot and other particulates accumulate on the upstream sides of the walls which lead to an increase in backpressure. To alleviate this increase in backpressure, the filter substrates are continuously or periodically regenerated by active or passive techniques including combusting the accumulated soot by known techniques including the use of an oxidation catalyst.

Exhaust gas passing through the porous substrate walls also contacts the SCR catalyst embodied in the walls, thus eliminating a major portion of the $NO_x$ components from the exhaust gas. It has been unexpectedly found that the zoning of SCR catalyst on a wall flow filter substrate of the present invention provides improved back pressure performance with the same or better catalytic performance, particularly $NO_x$ reduction performance, relative to the same amount of a similar SCR catalyst that is disposed more uniformly throughout the filter wall. The improved performance of this zoned filter is also surprising because the catalytic performance is not dependant upon the direction of gas flow through the filter (i.e., the direction of gas flow in contact with the catalytic compositions of the invention), but instead is dependent upon the overall flow of exhaust gas through the substrate.

The zoned SCFR articles of the present invention also offers improved ammonia storage performance compared to homogenously loaded SCRF articles. More particularly, zoning the SCR catalyst according to certain embodiments of the invention as described in more detail below (e.g., increasing the molecular sieve concentration in the zone proximal to the inlet face relative to the zone proximal to the outlet face), provides increased ammonia storage capacity in the section of the filter substrate that is likely to heat quickly during engine operation, while also providing decreased ammonia storage capacity near the outlet face of the filter substrate which reduces the likelihood of ammonia slip, particularly when the SCRF is treating exhaust gas having a high temperature and a high space velocity.

Preferred SCR catalysts for use with the present invention include one or more molecular sieves containing one or more transition metals. The type of molecular sieve suitable for use in the present invention is not particularly limited. However, preferred molecular sieves have a framework type selected from BEA, MFI (e.g., ZSM-5), or small-pore molecular sieves such as CHA, ERI, and LEV, as defined by International Zeolite Association. In certain preferred embodiments, the molecular sieve has a small pore framework type that has a maximum ring size of eight tetrahedral atoms. Particularly preferred small pore framework types include CHA, ERI and LEV, most preferably CHA. Where the Framework Type Code of the molecular sieve is CHA, an isotype framework structure of CHA can be selected from the group consisting of, for example, SAPO-34, SSZ-62, and SSZ-13. A molecular sieve having an ERI Framework Type can be, for example, erionite, ZSM-34 or Linde Type T. LEV Framework Type Code isotype framework structures or type material can be, for example, levynite, Nu-3, LZ-132 or ZK-20.

In certain preferred embodiments, the molecular sieve is an aluminosilicate or a silico-alumino-phosphate. Preferred aluminosilicate molecular sieves have a mole ratio of silica to alumina greater than about 10, more preferably from about 15 to about 250, more preferably from about 20 to about 50, and even more preferably from about 25 to about 40. The silica to alumina ratio of molecular sieves may be determined by conventional analysis. This ratio is meant to represent, as closely as possible, the silica-to-alumina ratio in the atomic framework of the molecular sieve crystal and preferably excludes aluminum in the binder or in cationic or other form within the channels. It will be appreciated that it may be extremely difficult to directly measure the silica to alumina ratio of the molecular sieve after it has been combined with a binder material. Accordingly, the silica to alumina ratio has been expressed hereinabove in term of the silica to alumina ratio of the parent molecular sieve, i.e., the molecular sieve used to prepare the catalyst, as measured prior to the combination of this molecular sieve with the other catalyst components.

Preferably, the catalyst composition comprises a molecular sieve and at least one extra framework metal to improve the catalytic performance and/or thermal stability of the material. As used herein, an "extra-framework metal" is one that resides within the molecular sieve and/or on at least a portion of the molecular sieve surface, does not include aluminum, and does not include atoms constituting the framework of the molecular sieve. The extra-framework metal can be added to the molecular sieve via any known technique such as ion exchange, impregnation, isomorphous substitution, etc.

Extra-framework metals may be of any of the recognized catalytically active metals that are used in the catalyst industry to form metal-exchanged molecular sieves. In one embodiment, at least one extra-framework metal is used in conjunction with the molecular sieve to increase the catalyst's performance. Preferred extra-framework metals are selected from the group consisting of copper, nickel, zinc, iron, tin, tungsten, cerium, molybdenum, cobalt, bismuth, titanium, zirconium, antimony, manganese, chromium, vanadium, niobium, ruthenium, rhodium, palladium, gold, silver, indium, platinum, iridium, rhenium, and mixtures thereof. More preferred extra-framework metals include those selected from the group consisting of chromium, cerium, manganese, iron, cobalt, nickel, and copper, and mixtures thereof. Preferably, at least one of the extra-framework metals is copper. Other preferred extra-framework metals include iron and cerium, particularly in combination with copper. For embodiments in which the aluminosilicate has a CHA framework, the preferred extra-framework metal is copper.

In one example, a metal-exchanged molecular sieve is created by blending the molecular sieve into a solution containing soluble precursors of the catalytically active metal. The pH of the solution may be adjusted to induce precipitation of the catalytically active cations onto or within the molecular sieve structure. For example, in a preferred embodiment a chabazite is immersed in a solution containing copper nitrate for a time sufficient to allow incorporation of the catalytically active copper cations into the molecular sieve structure by ion exchange. Unexchanged copper ions are precipitated out. Depending on the application, a portion of the unexchanged ions can remain in the molecular sieve material as free copper. The metal-substituted molecular sieve may then be washed, dried and calcined. When iron or copper is used as the metal cation, the metal content of the catalytic material by weight preferably comprises from about 0.1 to about 15 percent by weight, more preferably from about 1 to about 10 percent by weight, and even more preferably about 1 to about 5 percent by weight of the molecular sieve material.

Generally, ion exchange of the catalytic metal cation into or on the molecular sieve may be carried out at room temperature or at a temperature up to about 80° C. over a period of about 1 to 24 hours at a pH of about 7. The resulting catalytic molecular sieve material is preferably dried at about 100 to 120° overnight and calcined at a temperature of at least about 550° C.

Preferably, the molecular sieve catalyst is embodied in the substrate in an amount sufficient to reduce the $NO_x$ contained in an exhaust gas stream flowing through the substrate. In certain embodiments, at least a portion of the substrate may also contain an oxidation catalyst, such as a platinum group metal (e.g. platinum), to oxidize ammonia in the exhaust gas stream or perform other functions such as conversion of CO into $CO_2$.

Wall-flow substrates useful in the present invention can have any shape suitable for use in an exhaust system, provided that the substrate has an inlet face, an outlet face, and a length between the inlet and outlet faces. Examples of suitable shapes include circular cylinders, elliptic cylinders, and prisms. In certain preferred embodiments, the inlet face and outlet face are in parallel planes. However, in other embodiments the inlet and outlet faces are not parallel and the length of the substrate is curved.

The substrate preferably contains a plurality of channels that are approximately parallel to each other. The channels are defined by thin porous walls which preferably have a thickness of about 0.002 to about 0.1 inches, preferably about 0.002 and 0.015 inches. The cross-sectional shape of the channels is not particularly limited and can be, for example, square, circular, oval, rectangular, triangular, hexagonal, or the like. Preferably, the substrate contains about 25 to about 750 channels per square inch, and more preferably about 100 to about 400 channels per square inch.

Wall flow substrates are preferably constructed of one or more materials that include, as a predominant phase, ceramic, glass-ceramic, glass, cement, metal, oxides, and combinations thereof. By combinations is meant physical or chemical combinations, e.g., mixtures, compounds, or composites. Some materials that are especially suited to the practice of the present invention although it is to be understood that the invention is not limited to such, are those made of cordierite, mullite, clay, talc, zircon, zirconia, spinel, alumina, silica, borides, lithium aluminosilicates, alumina silica, feldspar, titania, fused silica, nitrides, borides, carbides, e.g., silicon carbide, silicon nitride or mixtures of these. A particularly preferred material is cordierite and silicon carbide.

Preferably, the substrate is constructed of a material having a porosity of at least about 50%, more preferably about 50-75%, and a mean pore size of at least 10 microns.

Preferably, the SCR catalyst resides in at least a portion of the pores of the wall, more preferably on the surfaces of the pores in the filter wall. It is highly preferred that the catalyst in the pores is disposed in a manner that does not clog the pores, which could overly restrict the flow of exhaust gas through the wall. More than one catalyst may be layered on top of each other in the pores. The catalyst material may also be disposed in the wall so as to form one or more concentration gradients between the upstream side and downstream side of the wall. Different catalyst may be loaded on the upstream and corresponding downstream sides of the wall.

In one embodiment, the SCR catalyst is zoned as shown in FIG. 2A. For this embodiment, the SCR catalyst of the first zone comprises a molecular sieve material loaded with an exchanged metal. Relative to the SCR catalyst in the first zone, the SCR catalyst in the second zone comprises the same molecular sieve material loaded with the same exchanged metal, but the molecular sieve concentration in the SCR catalyst of the second zone is at least 20% (e.g., about 20 to about 80%, about 25 to about 75%, about 25 to about 50%, about 30 to about 40%, about 20 to about 30%, about 30 to about 40%, about 50 to bout 75%, and about 40 to about 60%) less than the molecular sieve concentration in the SCR catalyst of the first zone, while the concentration of exchanged metal in the SCR catalysts of the first and second zones is about the same. As used herein, the term "at least 20% less" does not include 0%. For example, in the first zone, the molecular sieve concentration is preferably about 0.5 to about 2.5 g/in$^3$, and the exchanged metal concentration is about 10 to about 120 g/ft$^3$, but in the second zone, the molecular sieve concentration is at least 20% less than that of the first zone, while the exchanged metal concentration is about the same.

In another embodiment, the SCR catalyst is zoned as shown in FIG. 2A. For this embodiment, the SCR catalyst of the first zone comprises a molecular sieve material loaded with an exchanged metal. Relative to the SCR catalyst in the first zone, the SCR catalyst in the second zone comprises the same molecular sieve material loaded with the same exchanged metal, but the molecular sieve concentration and the exchanged metal concentration in the SCR catalyst of the second zone is at least 20% (e.g., about 20 to about 80%, about 25 to about 75%, about 25 to about 50%, about 30 to about 40%, about 20 to about 30%, about 30 to about 40%, about 50 to about 75%, and about 40 to about 60%) less than the molecular sieve concentration and exchanged metal concentration, respectively, in the SCR catalyst of the first zone. For example, in the first zone, the molecular sieve concentration is preferably about 0.5 to about 2.5 g/in$^3$, and the exchanged metal concentration is about 10 to about 120 g/ft$^3$, but in the second zone, the molecular sieve concentration and the exchanged metal concentration is at least 20% less than that of the first zone.

In another embodiment, the SCR catalyst is zoned as shown in FIG. 2A. For this embodiment, the SCR catalyst of the first zone comprises a molecular sieve material loaded with an exchanged metal. Relative to the SCR catalyst in the first zone, the SCR catalyst in the second zone comprises the same molecular sieve material loaded with the same exchanged metal, but the exchanged metal concentration in the SCR catalyst of the second zone is at least 20% (e.g., about 20 to about 80%, about 25 to about 75%, about 25 to about 50%, about 30 to about 40%, about 20 to about 30%, about 30 to about 40%, about 50 to bout 75%, and about 40 to about 60%) less than the exchanged metal concentration in the SCR catalyst of the first zone, while the concentration of molecular sieve in the SCR catalysts of the first and second zones is the same. For example, in the first zone, the molecular sieve concentration is preferably about 0.5 to about 2.5 g/in$^3$, and the exchanged metal concentration is about 10 to about 120 g/ft$^3$, but in the second zone, the exchanged metal concentration is at least 20% less than that of the first zone, while the molecular sieve concentration is about the same.

In another embodiment, the SCR catalyst is zoned as shown in FIG. 2A. For this embodiment, the SCR catalyst of the first zone comprises a molecular sieve material loaded with an exchanged metal. Relative to the SCR catalyst in the first zone, the SCR catalyst in the second zone comprises a different molecular sieve and/or metal. Preferably, the SCR catalyst in the first zone is more thermally stable relative to the SCR catalyst in the second zone. For example, the SCR in the first zone can be 3% copper in a molecular sieve having a CHA framework, and the SCR in the second zone can be 1% iron in a molecular sieve having a CHA framework.

In addition to a molecular sieve and exchanged metal, the SCR catalyst composition can comprise other components, such as binders (e.g., alumina) and modifiers. In certain embodiments, the overall concentration of the SCR catalyst composition in the first zone is about the same as the overall concentration of the SCR catalyst composition in the second zone. In other embodiments, the overall concentration of a SCR catalyst composition in the first zone is greater than the overall concentration of a SCR catalyst composition in the second zone.

In certain embodiments the first zone and second zone are adjacent to one another. In other embodiments, the first zone overlaps a portion of the second zone, preferably by less than 25%, and more preferably by less than 10%. In other embodiments, the second zone overlaps a portion of the first zone, preferably by less than 25%, and more preferably by less than 10%. In still other embodiments, the first and second zones are separated by a relatively small section of substrate wall that is either uncoated or is coated with an inert substance. Preferably, the small section is less than about 10 percent (e.g., about 1 to about 10 percent), and more preferably less than about 5 percent (e.g., about 1 to about 5 percent), of the channel length.

The embodiments shown in FIGS. 2A and 2B comprise a first catalyst zone and a second catalyst zone each extending for about half of the length of the channel wall in which they are embodied. Preferably, the first zone comprises from about 10 to about 90 percent, more preferably about 25 to 75, even more preferably about 40 to 60, of the length of the channel in which it is embodied. Preferably the second zone comprises from about 10 to about 90 percent, more preferably about 25 to 75, even more preferably about 40 to 60, of the length of the channel in which it is embodied.

Figure 3:
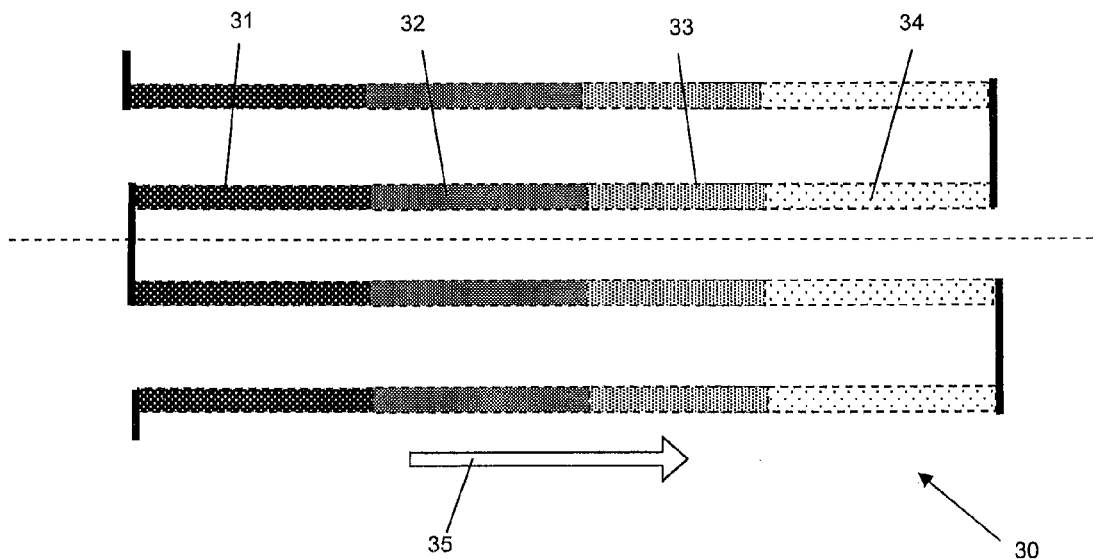
FIG. 3 shows cross-sectional views of a portion of a wall-flow filter unit having zoned catalyst according to another embodiment of the invention.

In certain embodiments, two or more catalytic zones are embodied in the substrate. For example, the substrate may comprise three, four, five, six, seven, or eight zones, preferably arranged in series with respect to axis of overall gas flow through the substrate. The number of zones is not particularly limited, but instead is dependent upon the particular application for which the substrate is designed. FIG. 3 shows an embodiment of the invention comprising a wall-flow substrate 30 having four zones, 31, 32, 33, and 34 arranged in series with respect to the overall gas flow 35 through the substrate. Where more than two zones are provided, the zones are preferably arranged to form a concentration gradient with the highest concentration being proximal to the inlet face of the substrate and the lowest concentration being proximal to the outlet face of the substrate. Preferably, each zone is differentiated from adjacent zones by at least 20 percent in relative concentration of catalyst and/or catalyst component.

Figure 4:
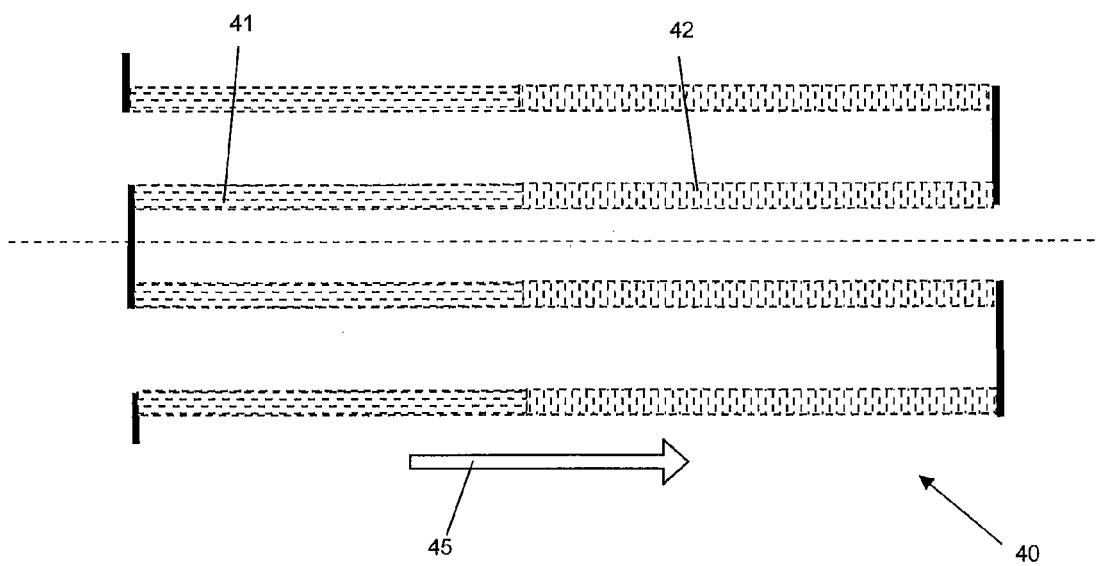
FIG. 4 shows cross-sectional views of a portion of a wall-flow filter unit having zoned catalyst according to another embodiment of the invention.

In certain embodiments, two or more different SCR catalysts can be used. Preferably, the SCR catalysts comprise a metal exchanged molecular sieve material. The different catalyst can have different molecular sieve material, different exchanged metals, or both. Preferably the different SCR catalysts have different thermal stability and preferably the different SCR catalysts are arranged in series with respect to the overall gas flow through the substrate. Preferably the most thermally stable SCR catalyst is disposed proximal to the inlet face and the least thermally stable is disposed proximal to the outlet face. In FIG. 4, shown is an embodiment of the invention having a more thermally stable SCR catalyst 41 and a less thermally stable SCR catalyst 42 disposed on a wall-flow substrate 40, wherein the more thermally stable SCR catalyst 41 is disposed proximal to the inlet face of the substrate.

Applications:

The catalytic molecular sieves described herein can promote the reaction of a reductant, preferably ammonia, with nitrogen oxides to selectively form elemental nitrogen ($N_2$) and water ($H_2O$) vis-à-vis the competing reaction of oxygen and ammonia. In one embodiment, the catalyst can be formulated to favor the reduction of nitrogen oxides with ammonia (i.e., and SCR catalyst). In another embodiment, the catalyst can be formulated to favor the oxidation of ammonia with oxygen (i.e., an ammonia oxidation (AMOX) catalyst). In yet another embodiment, an SCR catalyst and an AMOX catalyst are used in series, wherein both catalyst comprise the metal containing molecular sieve described herein, and wherein the SCR catalyst is upstream of the AMOX catalyst. In certain embodiments, the AMOX catalyst is disposed as a top layer on an oxidative under-layer, wherein the under-layer comprises a platinum group metal (PGM) catalyst or a non-PGM catalyst.

The reductant (also known as a reducing agent) for SCR processes broadly means any compound that promotes the reduction of $NO_x$ in an exhaust gas. Examples of reductants useful in the present invention include ammonia, hydrazine or any suitable ammonia precursor, such as urea (($NH_2$)$_2$CO), ammonium carbonate, ammonium carbamate, ammonium hydrogen carbonate or ammonium formate, and hydrocarbons such as diesel fuel, and the like. Particularly preferred reductant, are nitrogen based, with ammonia being particularly preferred.

According to another aspect of the invention, provided is a method for the reduction of $NO_x$ compounds or oxidation of $NH_3$ in a gas, which comprises contacting the gas with a catalyst composition described herein for the catalytic reduction of $NO_x$ compounds for a time sufficient to reduce the level of $NO_x$ compounds in the gas. In one embodiment, nitrogen oxides are reduced with the reducing agent at a temperature of at least 100° C. In another embodiment, the nitrogen oxides are reduced with the reducing agent at a temperature from about 150 to 750° C. In a particular embodiment, the temperature range is from 175 to 650° C. In another embodiment, the temperature range is from 175 to 550° C. In yet another embodiment, the temperature range is 450 to 750° C., preferably 450 to 700° C., even more preferably 450 to 650° C.

In another embodiment, the nitrogen oxides reduction is carried out in the presence of oxygen. In an alternative embodiment, the nitrogen oxides reduction is carried out in the absence of oxygen.

The method can be performed on a gas derived from a combustion process, such as from an internal combustion engine (whether mobile or stationary), a gas turbine and coal or oil fired power plants. The method may also be used to treat gas from industrial processes such as refining, from refinery heaters and boilers, furnaces, the chemical processing industry, coke ovens, municipal waste plants and incinerators, etc. In a particular embodiment, the method is used for treating exhaust gas from a vehicular lean burn internal combustion engine, such as a diesel engine, a lean-burn gasoline engine or an engine powered by liquid petroleum gas or natural gas.

According to a further aspect, the invention provides an exhaust system for a vehicular lean burn internal combustion engine, which system comprising a conduit for carrying a flowing exhaust gas, a source of nitrogenous reductant, and a molecular sieve catalyst described herein. The system can include means, when in use, for controlling the metering means so that nitrogenous reductant is metered into the flowing exhaust gas only when it is determined that the molecular sieve catalyst is capable of catalyzing $NO_x$ reduction at or above a desired efficiency, such as at above 100° C., above 150° C. or above 175° C. The determination by the control means can be assisted by one or more suitable sensor inputs indicative of a condition of the engine selected from the group consisting of: exhaust gas temperature, catalyst bed temperature, accelerator position, mass flow of exhaust gas in the system, manifold vacuum, ignition timing, engine speed, lambda value of the exhaust gas, the quantity of fuel injected in the engine, the position of the exhaust gas recirculation (EGR) valve and thereby the amount of EGR and boost pressure.

In a particular embodiment, metering is controlled in response to the quantity of nitrogen oxides in the exhaust gas determined either directly (using a suitable $NO_x$ sensor) or indirectly, such as using pre-correlated look-up tables or maps—stored in the control means—correlating any one or more of the abovementioned inputs indicative of a condition of the engine with predicted $NO_x$ content of the exhaust gas. The metering of the nitrogenous reductant can be arranged such that 60% to 200% of theoretical ammonia is present in exhaust gas entering the SCR catalyst calculated at 1:1 $NH_3$/NO and 4:3 $NH_3$/$NO_2$. The control means can comprise a pre-programmed processor such as an electronic control unit (ECU).

In a further embodiment, an oxidation catalyst for oxidizing nitrogen monoxide in the exhaust gas to nitrogen dioxide can be located upstream of a point of metering the nitrogenous reductant into the exhaust gas. In one embodiment, the oxidation catalyst is adapted to yield a gas stream entering the SCR molecular sieve catalyst having a ratio of NO to $NO_2$ of from about 4:1 to about 1:3 by volume, e.g. at an exhaust gas temperature at oxidation catalyst inlet of 250 to 450° C. The oxidation catalyst can include at least one platinum group metal (or some combination of these), such as platinum, palladium, or rhodium, coated on a flow-through monolith substrate. In one embodiment, the at least one platinum group metal is platinum, palladium or a combination of both platinum and palladium. The platinum group metal can be supported on a high surface area washcoat component such as alumina, a molecular sieve such as an aluminosilicate molecular sieve, silica, non-zeolite silica alumina, ceria, zirconia, titania or a mixed or composite oxide containing both ceria and zirconia.

In a further aspect, there is provided a vehicular lean-burn engine comprising an exhaust system according to the present invention. The vehicular lean burn internal combustion engine can be a diesel engine, a lean-burn gasoline engine or an engine powered by liquid petroleum gas or natural gas.

EXAMPLES

The following non-limiting examples are provided to further illustrate certain aspects of the invention.

Example 1

Homogeneous and Zone Coated SCR-Filter Preparation

Two commercially available silicon carbide wallflow filters (NGK Insulators Ltd), with cross-section 4.02 inch×7.81 inch (10.2 cm×19.8 cm) and 6.85 inches (17.4 cm) in axial length, having a cell density of 300 cells per square inch, channel wall thickness of 0.305 mm, porosity of 52% and mean pore size of 23 μm were used to investigate the properties of zone coated SCR coated filter versus homogeneously coated SCR coated filter. Both wallflow filters were coated at an overall loading of 0.9 g/in$^3$ with a washcoat comprising a dispersion of copper zeolite (2.5 wt % copper) and alumina and zirconia binder material (18% of the total washcoat solids).

SCR catalyst was homogeneously coated by (1) applying a 15 wt % solids slurry to a depth sufficient to coat the channels of the substrate along the entire axial length of the substrate from the outlet direction. (2) Then excess slurry was removed by vacuum, and (3) the filter then dried in flowing air at 100° C. The process steps (1) to (3) were repeated for the opposite end of the wallflow filter and the SCR coated filter was fired at 500° C. for 1 hour. Final SCR catalyst loading was homogeneous distributed at 0.9 g/in$^3$.

The zone coated SCR coated filter was prepared by (1) applying a 34 wt % solids slurry to a depth sufficient to coat the channels of the substrate along 40% of the axial length of the substrate from the inlet direction. (2) Then vacuum applied to remove excess washcoat, and (3) the filter dried in flowing air at 100° C. (4) A 17% solids slurry then to a depth sufficient to coat the channels of the substrate along 60% of the axial length of the substrate from the outlet direction. (5) Vacuum applied to remove excess washcoat, followed by (6) the filter dried in flowing air at 100° C. and firing at 500° C. for 1 hour. This process resulted in a zone-coated SCR coated filter, with the front 40% of axial length coated to a loading of 1.4 g/in$^3$ and the rear 60% axial length coated to a loading of 0.56 g/in$^3$.

Example 2

Performance Testing

The rate of back-pressure increase relative to soot loading for each of the filters of Example 1 using Diesel exhaust gas containing particulate matter were tested using the Diesel particulate generator (DPG) and test cell disclosed in European Patent 1850068 AI and manufactured by Cambustion Ltd. That is, an apparatus for generating and collecting particulate matter derived from combusting a liquid carbon-containing fuel, which apparatus comprising a fuel burner comprising a nozzle, which nozzle is housed in a container, which container comprising a gas inlet and a gas outlet, said gas outlet connecting with a conduit for transporting gas from the gas outlet to atmosphere, means for detecting a rate of gas flowing through the gas inlet and means for forcing an oxidising gas to flow from the gas inlet via the container, the gas outlet and the conduit to atmosphere, a station for collecting particulate matter from gas flowing through the conduit and means for controlling the gas flow-forcing means in response to a detected gas flow rate at the gas inlet, whereby the rate of gas flow at the gas inlet is maintained at a desired rate to provide sub-stoichiometric fuel combustion within the container, thereby to promote particulate matter formation.

The filters were fitted each in turn in the station with the inlet channels pre-coated by the supplier with membrane layer disposed to receive particulate-containing exhaust gas first. The apparatus was operated with standard forecourt pump Diesel fuel containing a maximum of 50 ppm sulphur. The DPG unit was operated with a gas mass flow rate of 250 kg/hour, a particulate generation rate of 10 g/hr with an inline particulate silicon carbide filter maintained at about 240° C. During the particulate matter loading of each filter the back pressure was determined by a differential pressure sensor and logged on a computer every 10 seconds.

DOC and SCRF systems using the filters in Example 1 were evaluated over simulated MVEG cycles using a 2 L 4 cylinder engine and a transient dynamometer.

A 1.25 L Pt Pd oven aged DOC was fitted upstream of a 2.5 L high porosity SiC filter coated with an engine aged SCRF catalyst. A commercially available urea dosing system was used, with urea injection to allow a mixing length of 25 cm upstream of the SCRF; minimum dosing temperature was 180 C. Repeated MVEG cycles were run.

Figure 5:
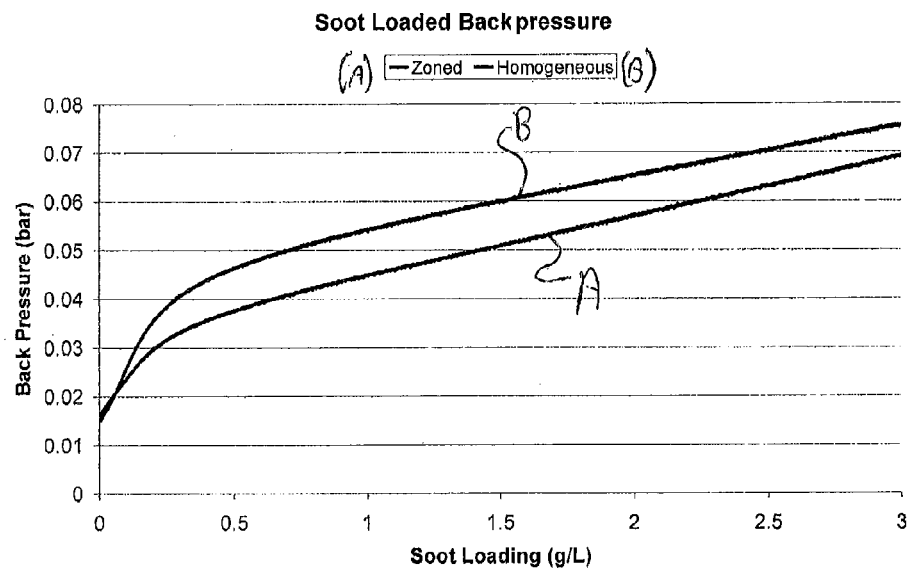
FIG. 5 is a graph comparing backpressure data for a wall-flow filter unit having zoned catalyst according to an embodiment of the invention and a homogeneously distributed catalyst on a wall-flow filter.
Figure 6:
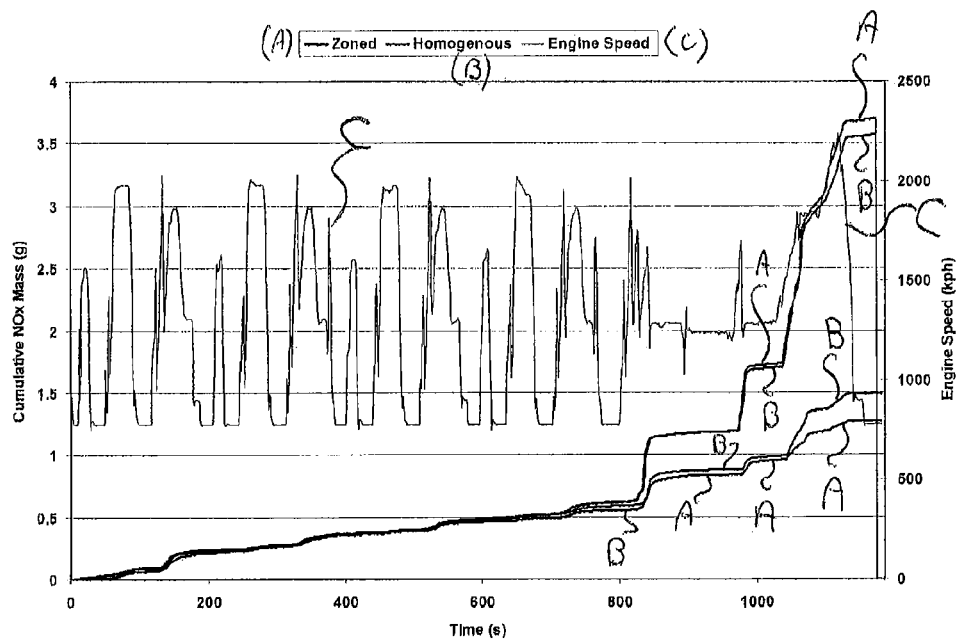
FIG. 6 is a graph comparing cumulative $NO_x$ mass data for a wall-flow filter unit having zoned catalyst according to an embodiment of the invention and a homogeneously distributed catalyst on a wall-flow filter.

As can be seen from the data in FIGS. 5 and 6, the zoned SCRF according to the present invention offers substantially reduced backpressure compared to an equivalent non-zoned SCRF. In addition, the zoned SCRF provides greatly improved NO$_x$ reduction performance.

What is claimed is:

1. A catalyst article comprising:
   a. a wall flow monolith having an inlet face end and an outlet face and an axis of gas flow from said inlet face to said outlet face;
   b. a first SCR catalyst composition comprising a molecular sieve framework at a first sieve concentration and an exchanged metal at a first metal concentration, wherein said first SCR catalyst is disposed in a first zone;
   c. a second SCR catalyst composition comprising said molecular sieve framework and comprising said exchanged metal at a second metal concentration that is at or below said first metal concentration, wherein said second SCR catalyst is disposed in a second zone;
      wherein said first zone and second zone are disposed within a portion of said wall flow monolith and in series along said axis, and wherein said first zone is disposed proximal to said inlet face, and said second zone is disposed proximal to said outlet face; and
   d. one or more intermediate zones disposed between said first and second zones and in series along said axis, wherein said intermediate zones each comprise an SCR catalyst composition having said molecular sieve framework and said exchanged metal wherein said intermediate zones are arranged to form a metal concentration gradient having a high concentration end and a low concentration end with the high concentration end being closer to the inlet face relative to the low concentration end.

2. The catalyst article of claim 1 wherein said molecular sieve is a zeolite having a framework selected from the group consisting of BEA, MFI, CHA, ERI, and LEV.

3. The catalyst article of claim 1 wherein said first sieve concentration is about 0.5 to about 2.5 g/in$^3$.

4. The catalyst article of claim 1 wherein said exchanged metal is selected from copper and iron.

5. The catalyst of claim 1 wherein said first metal concentration is about 10 to about 500 g/ft$^3$.

6. The catalyst of claim 1 wherein said wall flow monolith has a pore size of at least about 10 microns and a porosity of at least about 50%.

7. The catalyst article of claim 1 wherein said wall flow monolith has an efficiency of at least about 70% for soot particles in a diesel engine exhaust gas.

8. The catalyst article of claim 1 wherein said first zone and said second zone overlap by less than about 25%.

9. The catalyst article of claim 1 wherein said first zone is disposed on about 10 to about 90% of the distance between said inlet face and said outlet face.

10. The catalyst article of claim 1 wherein said first zone is disposed on about 40 to about 60% of the distance between said inlet face and said outlet face.

11. The catalyst article of claim 1 wherein said second metal concentration is at least 20% lower than said first metal concentration.

12. The catalyst article of claim 11 wherein said second sieve concentration is at least 20% lower than said first sieve concentration.

13. A method for reducing $NO_x$ in an exhaust gas comprising contacting the gas with a catalyst article according to claim 1 for a time and temperature sufficient to reduce the level of $NO_x$ compounds in the gas.

14. The method of claim 13 further comprising:
a. operating a diesel engine under conditions to generate a feed stream of said exhaust gas comprising $NO_x$ and soot and having a temperature of about 250 to 550° C. and having a space velocity of about 20,000 to about 120,000/hour;
b. injecting a reductant in to said feed stream to create an intermediate stream; and
c. passing said intermediate stream through said catalyst article according to claim 1 to produce a purified exhaust gas stream having a reduced soot and $NO_x$ concentration relative to said feed stream;
  wherein said purified exhaust gas stream has no ammonia or a concentration of ammonia that is less than an amount of ammonia that would be present if the intermediate stream were passed through a catalyst article similar to claim 1, but having an SCR catalyst homogenously distributed with respect to the direction of overall gas flow.

15. The method of claim 13 further comprising:
a. operating a diesel engine under conditions to generate a stream of said exhaust gas comprising $NO_x$ and soot and having a temperature of about 250 to 550° C. and having a space velocity of about 20,000 to about 120,000/hour;
b. injecting a reductant in to said stream to create an intermediate stream; and
c. passing said intermediate stream through said catalyst article according to claim 1 to produce a purified exhaust gas stream having a reduced soot and $NO_x$ concentration relative to said feed stream, wherein said passing step produces a resistance to gas flow that is less than the amount of gas flow resistance that would be produced if the intermediate stream were passed through a catalyst article according to claim 1, but having an SCR catalyst homogenously distributed with respect to the direction of overall gas flow.

16. An engine exhaust gas treatment system comprising:
a. a catalyst article according to claim 1; and
b. a source of ammonia or urea upstream of said catalyst article.

* * * * *